2,920,752

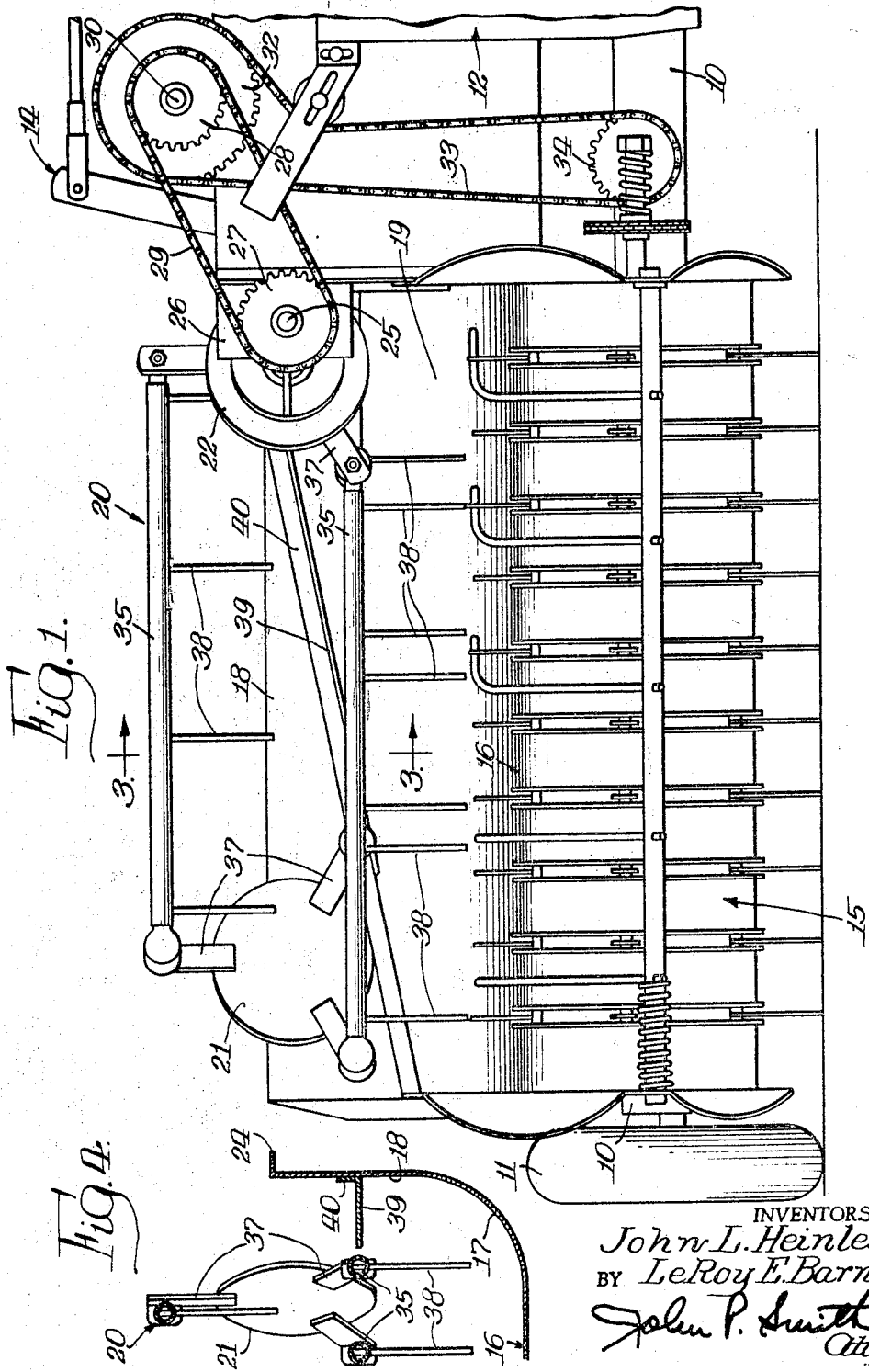

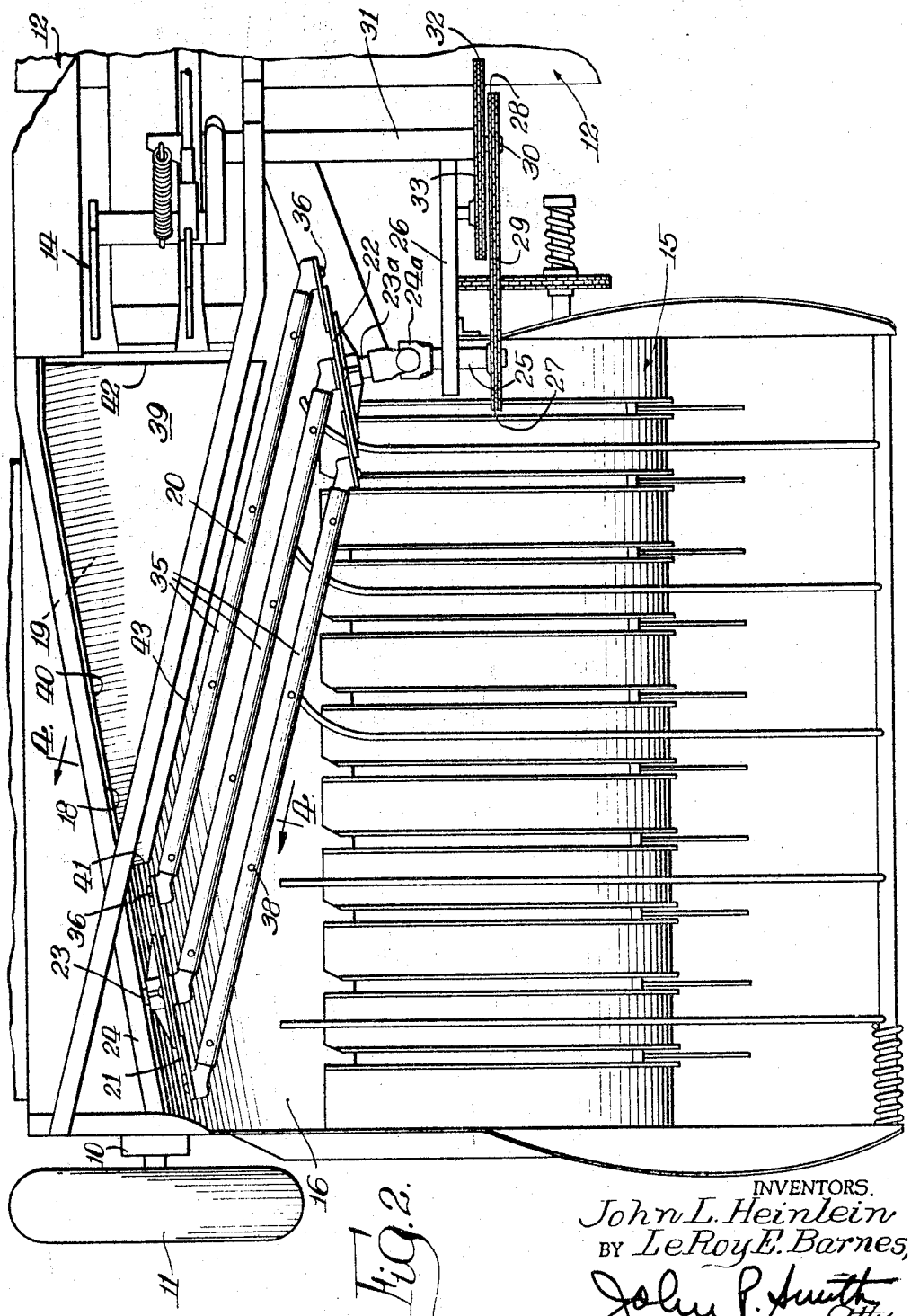

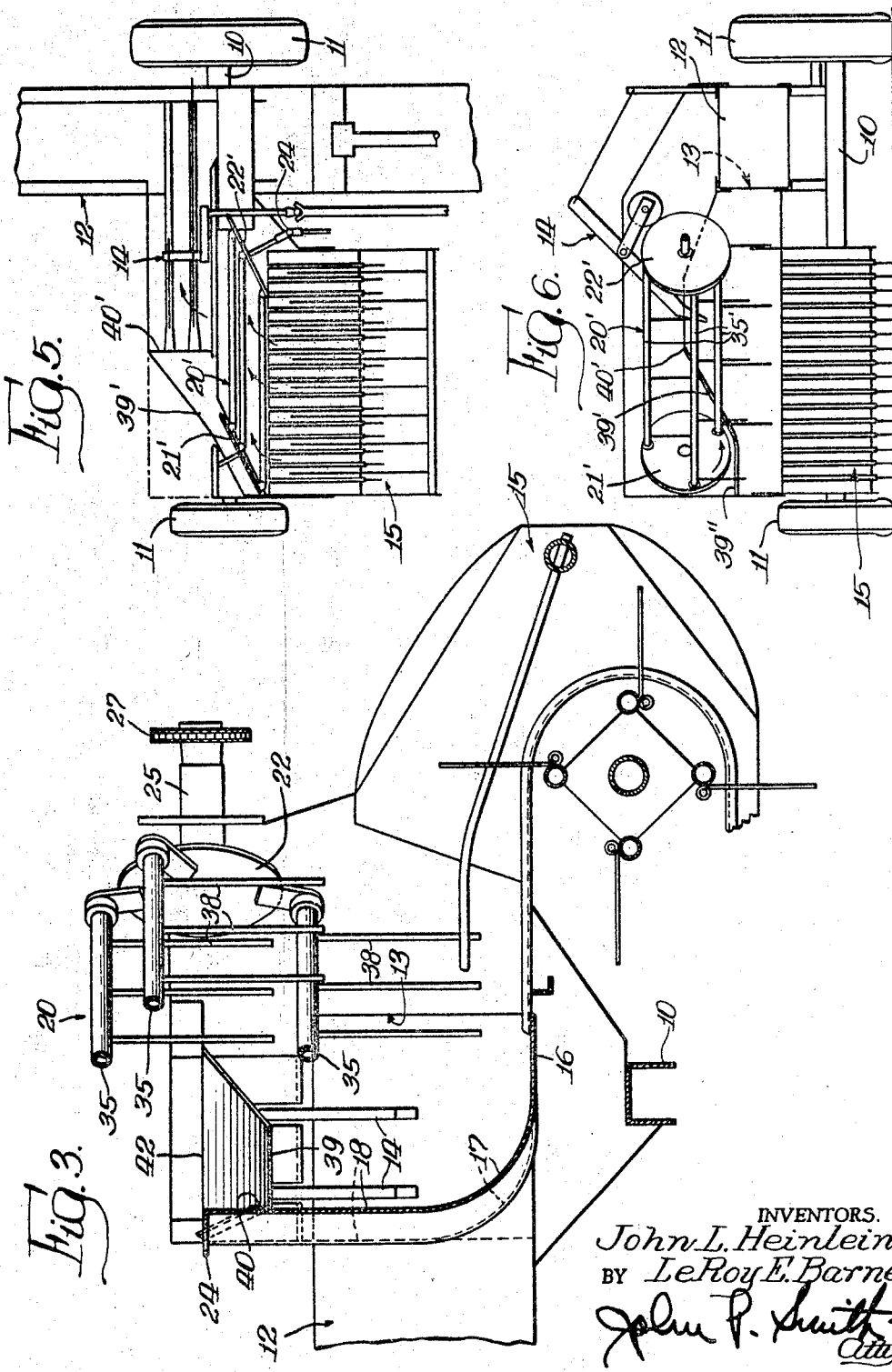

CROSS FEED MECHANISM FOR HARVESTER OR BALER

John L. Heinlein and Le Roy E. Barnes, Shelbyville, Ill., assignors to The Oliver Corporation, a corporation of Delaware Application January 14, 1958, Serial No. 708,846

1 Claim. (Cl. 198—223)

The present invention relates generally to a material conveying mechanism for harvesters such as forage harvesters, grain combines, windrowers and pick-up balers, but more particularly to a novel and improved means of transferring or conveying the material especially from a pick-up mechanism of a baler to the opening in the baling chamber thereof.

One of the primary objects of the present invention is to provide a novel and improved cross-feed or conveying mechanism for a harvester which will move the material from the gathering or pick-up mechanism in a direction obliquely or angularly with respect to the line of travel of the harvester toward other transferring or conveying mechanisms of the harvester.

A further object of the invention is to provide a novel and improved construction of a cross-feed mechanism for a baler in which a plurality of sets of tines are rotatably mounted on a plurality of rake bars in such a manner that each single tine or set of tines travel in an orbit or single vertical plane which is located obliquely or angularly with respect to the direction of travel of the baler. In other words, these obliquely travelling tines move in parallel paths so as to not only move the material rearwardly and laterally across the platform to the bale chamber, but also have the tendency to break up massed or packed material being fed so as to feed it more evenly or uniformly to the bale chamber.

A further object of the invention is to provide a simple and very efficient rotary rake tine cross-feed mechanism for a pick-up baler which will handle all types of material with equal ease and will not exert a down packing pressure on the material such as is occasioned by the auger type of conveyor.

These and other objects are accomplished by providing a construction and an arrangement of the various parts in the manner hereinafter described and particularly pointed out in the appended claim.

Referring to the drawings:

Fig. 1 is a fragmentary front elevational view of a pick-up baler showing one embodiment of our improved cross conveying mechanism;

Fig. 2 is a top plan view of the construction shown in Fig. 1;

Fig. 3 is a fragmentary cross-sectional view taken on the lines 3—3 in Fig. 1;

Fig. 4 is a fragmentary cross-sectional view taken on the lines 4—4 in Fig. 2;

Fig. 5 is a reduced size fragmentary diagrammatic top plan view of a modified construction of our invention; and Fig. 6 is a similar front elevational view of the modified form shown in Fig. 5.

In illustrating one embodiment of our invention, we have shown the same in connection with a more or less conventional type of pick-up baler which comprises briefly a transverse axle and main frame member 10 supported on the usual oppositely disposed wheels 11. Mounted on the main frame member 10 is the usual longitudinally extending bale forming frame structure which contains the bale chamber, generally indicated by the reference character 12. This bale frame structure contains the usual or conventional reciprocating plunger and wire or twine tying mechanism (not shown). The opening in the side of the bale chamber through which the material is conveyed to the chamber is generally indicated by the reference character 13. Positioned above the opening 13 in the bale chamber 12 is a conventional rotating and reciprocating packer arm, generally indicated by the reference character 14. This packer arm 14 conveys the material from the storage area of the platform of the cross-feed to the baling chamber and is driven in proper synchronization with the operation of the plunger.

Adjustably and pivotally mounted on one side of the longitudinal extending baling frame structure 12 is a conventional gathering and pick-up mechanism, generally indicated by the reference character 15. This pick-up mechanism 15 may be of any desired construction and is adapted to elevate the material inwardly and over the top thereof to a horizontal platform 16 located rearwardly of the pick-up mechanism 15. This platform is substantially in horizontal alignment with the lower edge of the opening 13 in the bale chamber 12. The rear portion of the platform curves upwardly as shown at 17 into a vertically disposed rear wall 18. See Fig. 3 of the drawings. The curved portion 17 and rear wall 18 are obliquely disposed or inclined inwardly and rearwardly from the outer end of the platform toward the bale chamber in order to form in effect a storage area as shown generally at 19. This storage area 19 is located laterally of and within reach of the packer arm 14 and rearwardly of our improved obliquely arranged rotary tine bar cross-feed hereinafter more fully described.

The primary novel construction of the present invention, as disclosed in the preferred form, as shown in Figs. 1 to 4 inclusive of the drawings, and in the modified form as shown in Figs. 5 and 6 of the drawings, include rotary tine bar reel generally indicated by the reference character 20. This rotary reel 20 may be positioned so that the tine bars are positioned obliquely with respect to the line of travel of the baler as shown in Figs. 1 to 4 of the drawings, or the tine bars may be positioned at right angles to the line of travel of the baler. In both cases the end spiders or discs are angularly disposed so that tines will travel in an orbit diagonally with respect to the longitudinal line of travel of the baler.

This rotary reel 20 comprises outer and inner rotary spiders or discs 21 and 22 respectively. The spider 21 is journaled on a stub shaft 23 carried by a frame member 24 of the baler. The spider 21 is positioned to rotate at an oblique angle to the line of travel of the baler. The inner rotary spider 22 is positioned at a slight distance forwardly of the outer spider 21 and is arranged so that it rotates in a plane parallel to the spider 21. The spider 22 is supported on and driven by a stub shaft 23a. The stub shaft 23a is connected to a universal joint 24a which, in turn, is secured to a stub shaft 25 journaled in a frame member 26 of the baler. Secured to the shaft 25 is a sprocket wheel 27 which, in turn, is driven by a sprocket wheel 28 by a suitable chain 29. The sprocket wheel 28 is secured to a longitudinally extending shaft 30 journaled in a bearing 31 of the baler frame. Additional sprocket wheels 32 secured to the shaft 30 and geared to suitable transmission mechanism such as chain 33, sprocket wheel 34, drives the reel from the operatively driven parts of the baler in any suitable manner. The reel 20 in this instance comprises a plurality of uniformally spaced apart tine bars 35 which have their opposite ends journaled on bearing studs 36 secured to uniformly spaced apart radially disposed arms 37. The arms 37 are secured to the respective discs 21 and 22. Projecting downwardly from and secured to each of the bars 35 are vertically depending tines 38. These tines 38 may be spaced on each of the bars 35 at any desired intervals, but are preferably spaced uniformly so that the sets on the three bars travel in a single orbit or plane in which the plane is oblique to the line of direction of travel of the baler.

In this connection it will be noted that all the tines travel in their lower sweep adjacent the platform in a direction rearwardly and laterally in the direction of the storage area 19 and toward the opening 13 in the side of the bale chamber. It will also be observed that the tines travel to a greater extent laterally than they do rearwardly, thus expeditiously and more efficiently conveying the material toward the storage area and within reach of the reciprocating packer member 14 for conveying the material into the opening in the bale chamber. This oblique movement of the tines helps to break up the mass of material and also fluffs up the material to more evenly distribute the same and form a more satisfactory bale of uniform density.

Another essential feature of the present invention includes a sheet iron stripper or guide member 39 which is substantially triangular in shape and has its rear edge, as shown at 40, secured to the rear wall 18. The outer end of the stripper plate 39 is substantially pointed as shown at 41 and extends upward at an angle toward the bale chamber where it widens and terminates, as shown at 42, adjacent the packing arm 14. This stripper plate is positioned above the storage area 19 and serves the function of slightly compressing fluffed material so as to be in a position to be engaged by the packer arm 14. The stripper plate 39 has its forward edge 43 positioned parallel to the rotary reel 20 at a point adjacent the path of the upward path of movement of the tines for the purpose of stripping the material from the tines.

In the modified form of the invention disclosed in Figs. 5 and 6 of the drawings, the construction and operation is essentially the same as in the preferred form except the tine bars 35' of the reel 20' are at right angles to the line of travel of the baler. The spiders or discs 21' and 22' are positioned at a slightly greater angle to a transverse line of the baler. In this modified form a different shape of stripper, as shown at 39' is positioned to the rear of the spider 21' and extends from a position below the disc 21' as shown at 39" upwardly at an angle, as shown in Fig. 6 of the drawings, where it terminates, as shown at 40'. In both forms of the invention, the path of travel of the tines is essentially identical and the function of operation substantially the same.

Summarizing the construction and the function of operation of our improved invention, it will readily be seen that by providing a rotary rake tine bar or reel construction which can be arranged on the cross-feed platform of a harvester or baler so that the tines of the reel travel in oblique or diagonal paths with respect to the longitudinal travel of the harvester or baler, a very efficient means is afforded for feeding a wide variety of materials from the pickup mechanism to the storage area within easy reach of the supplemental conveying means or packer arm for feeding the material toward the harvester or baler. It will also be noted that the stripper plate and shield perform not only the function of stripping the material from the tines, but also the additional function of guiding and compressing fluffed up material for more readily handling by the packer arm in the case of the baler.

While in the above specification we have described one preferred form and one modified form which our invention may assume in practice, it will, of course, be understood that the same is capable of other modifications and such other modifications may be made without departing from the spirit and scope of the invention as expressed in the following claim.

What we claim as our invention and desire to secure by Letters Patent is:

In a crop harvester having a platform to which a crop being harvested is initially fed oppositely of the direction of travel of the harvester, a cross feed mechanism for subsequently moving said crop transversely of the direction of travel of the harvester, said cross feed mechanism comprising a pair of parallel spaced apart tine bar support members rotatably mounted on said harvester above said platform, the planes of rotation of said support members being angularly disposed with respect to the direction of travel of said harvester and the axes of rotation of said support members being parallel and offset from each other, a plurality of tine bars extending between said support members and operatively connected thereto at the respective ends thereof, said tine bars extending parallel to each other at an acute angle to the planes of rotation of said support members, a plurality of downwardly depending tines on said tine bars, and driving means operatively connected to one of said support members for moving said tine bars generally forwardly at the top and rearwardly at the bottom of their paths of travel relative to said platform as said harvester moves in said direction of travel.

References Cited in the file of this patent

UNITED STATES PATENTS

| | | |
|---|---|---|
| 2,030,031 | Innes | Feb. 4, 1936 |
| 2,467,717 | Acton | Apr. 19, 1949 |
| 2,499,615 | Tuft | Mar. 7, 1950 |
| 2,545,188 | Baskerville | Mar. 13, 1951 |
| 2,571,489 | Russell | Oct. 16, 1951 |
| 2,627,714 | Freeman et al. | Feb. 10, 1953 |
| 2,681,543 | Richey | June 22, 1954 |
| 2,739,438 | McClellan | Mar. 27, 1956 |